United States Patent [19]

Sabina, Jr.

[11] 4,431,027
[45] Feb. 14, 1984

[54] RESERVOIR FOR REMOTE FLUID SYSTEM

[75] Inventor: John J. Sabina, Jr., Troy, Mich.

[73] Assignee: General Motors Corporation, Detroit, Mich.

[21] Appl. No.: 255,996

[22] Filed: Apr. 21, 1981

[51] Int. Cl.³ .............................................. E03B 11/00
[52] U.S. Cl. .................................... 137/574; 137/576; 137/592; 220/22
[58] Field of Search ............................ 220/22; 60/592; 137/574, 576

[56] References Cited

U.S. PATENT DOCUMENTS

| | | | |
|---|---|---|---|
| 3,642,086 | 2/1972 | Andrews | 220/22 |
| 3,993,094 | 11/1976 | Spooner | 137/576 |
| 4,147,270 | 4/1979 | Brandon, Jr. et al. | 220/22 |
| 4,176,877 | 10/1979 | Pickering | 220/22 |
| 4,210,176 | 7/1980 | Emming | 137/574 |
| 4,217,992 | 8/1980 | Come | 220/22 |

OTHER PUBLICATIONS

FIG. 6B-10-Coolant Recovery Bottles, *1981 Chevrolet Service Manual*, pp. 6B-15.

*Primary Examiner*—A. Michael Chambers
*Attorney, Agent, or Firm*—Dean L. Ellis

[57] ABSTRACT

A remote fluid reservoir blow-molded of polymeric material is provided with an antechamber for the reception of incoming high velocity fluid and impinging of same in a sinuous course on walls of the antechamber which are so configured as to smoothly reduce flow velocity and avoid undue turbulence upon introduction of the fluid into a main storage chamber.

3 Claims, 7 Drawing Figures

RESERVOIR FOR REMOTE FLUID SYSTEM

This invention relates to fluid systems and more particularly to reservoirs for such systems located remote from the system proper and connected thereto by conduits.

Recent designs of automotive power steering systems separate the fluid reservoir of the system from what formerly had been unitary association thereof with the engine-driven pump. Crowding of engine compartments has led to need for more efficient utilization of space through location of the reservoir remote from the engine and the pump and connection between the two and with the power steering gear via connecting hoses.

It is desirable to mold the remote reservoir of polymeric material for a shape suited to the available space at the selected location in the engine compartment. Additionally, it is necessary to ensure that as the reservoir receives relatively high velocity fluid flow returning from the power steering gear, it does so without undue turbulence within the reservoir and entrainment of air bubbles within the fluid. Such air entrainment affects the fluid viscosity and in turn degrades the efficiency of the fluid system.

By the present invention there is provided a remote fluid reservoir moldable from polymeric or like material to a desired shape and provided with a main reservoir portion and an antechamber portion especially designed to receive the high-velocity incoming fluid flow, traverse it in a sinuous course through smoothly widening cross-sectional areas of the antechamber to substantially reduce the flow velocity, and introduce the flow to a main storage portion of the reservoir without undue turbulence and air entrainment.

In a preferred embodiment, the reservoir is blow-molded and the main storage and the antechamber portions suitably defined as by the known use of mold-closure regions, the reservoir further featuring an antechamber of generally L-shape in vertical section adapted to reception of the incoming high-velocity fluid, as a first stage of the sinuous course, laterally at an upper narrow end of the antechamber and impingement upon opposed walls of the latter, thence a direction of the flow into smoothly widening areas of the two legs of the antechamber which achieve the desired velocity reduction.

The fluid flow is turned and introduced to the main storage portion through an opening communicating the separate cavities of the two reservoir portions. In the blow-molded embodiment the communicating opening is formed incidental to a merging of walls of the two otherwise separated portions below a mold-closure gap defined by mating generally mirror-image mold pieces and at the margins of the mold cavities for the antechamber and main chamber portions.

These and other objects, features and advantages of the invention will be readily apparent in the following specification and from the drawings wherein.

Figure 1:
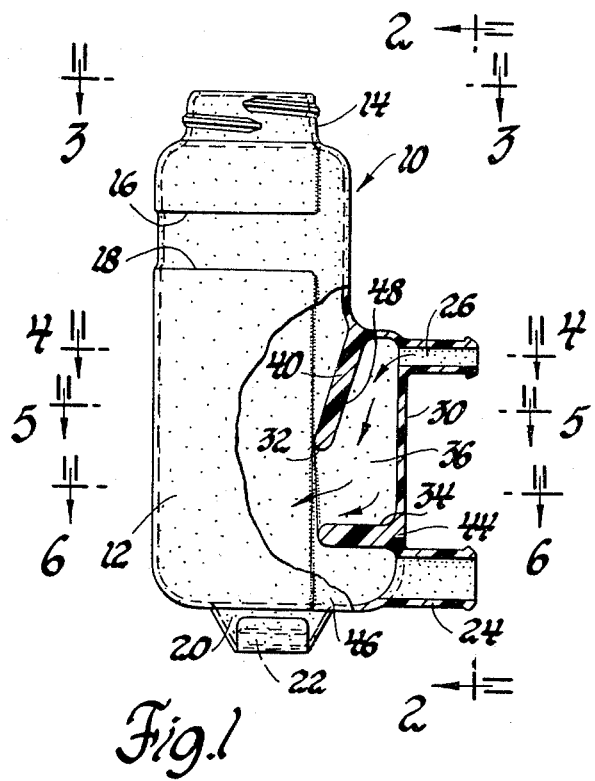
FIG. 1 is a partially broken away elevational view of a reservoir according to the invention.

The remote reservoir is indicated generally as 10 and is preferably fabricated by use of blow molding within mated mold halves. High ambient temperature-resistant nylon has been found to be a preferred material but other polymeric materials may be found to be equally acceptable. The illustrated shape of reservoir 10 has been found in one application to be well suited to the noted objective of efficient space utilization. It is mounted within the vehicle engine compartment generally in the upright or vertical condition illustrated. This design includes a main storage chamber portion 12 provided at its upper end with a filler neck 14 threaded for installation of a removable closure cap. Immediately therebelow, the main storage portion is molded with shoulder formations 16 and 18 defining a waist section adapted to cooperate with a clamp strap or band to mount the reservoir on a selected wall of the engine compartment. At the bottom of the main storage portion there is provided a depending well 20 containing a magnet disc 22 which attracts and holds any foreign metallic particles which may be introduced into the fluid circulating through reservoir 10.

Connection of the reservoir to the supply side of a remotely located power steering pump and associated fluid system is provided via an outlet hose nipple or tube 24 molded integrally with and extending laterally of the bottom of the main storage portion 12. Connection of the reservoir to incoming fluid exiting the remote power steering gear or other element of such system is provided by an inlet hose nipple or tube 26. As is typical with power steering gears and like fluid motors the exiting fluid thereof is carried in relatively small diameter conduits or hoses at relatively high velocity. Nipple 26 is molded or sized to conform to existing automotive specifications for such hose, as is nipple 24. It has been found that in the circumstances of such high velocity, special needs do arise, when providing a remote reservoir, to handle the incoming fluid prior to introduction into the main chamber portion 12 so that it does enter at much reduced velocity and free of turbulence tending toward undue entrainment of air that may be contained in the upper region of the main chamber 12.

Figure 2:
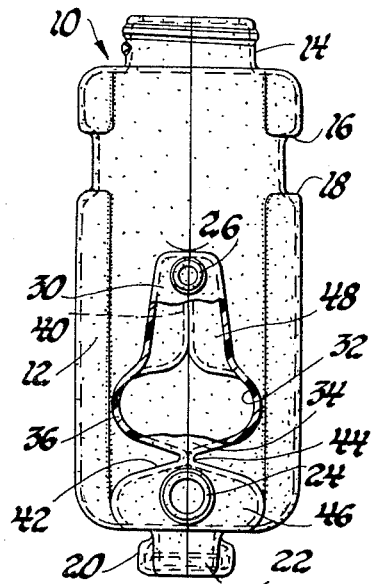
FIG. 2 is a partially broken away elevational view taken generally along the plane indicated by lines 2—2 of FIG. 1.
Figure 3:
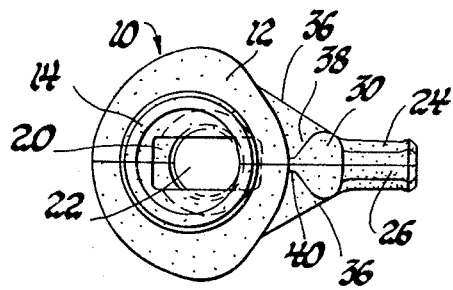
FIG. 3 is a plan view in the direction of lines 3—3 of FIG. 1.

To this end, reservoir 10 is molded with an antechamber portion 30 integrally associated with inlet nipple 26. Referring to FIGS. 1, 2 and 7, such antechamber portion is generally L-shaped in vertical section and structured to have a gradually varying cross sectional area taken in sections laterally across a sinuous path of fluid flow traversing the antechamber. Such fluid flow path is generally indicated by the arrows in FIG. 1 emanating inwardly from nipple 26. The fluid flow path leads through essentially a vertical leg of the antechamber ultimately to an opening 32 at the exit of the lower end or lateral leg region 34 of the antechamber. Such lower end or leg is generally triangular in lateral cross section as indicated best in FIG. 6 and has its walls 36 merging integrally with the walls of the main storage chamber 12 as seen best in FIG. 7. To minimize turbulence in the main chamber 12, the area of opening 32 is made many times larger than the area of the passage through nipple 26, thereby to substantially reduce fluid velocity. In one commercial embodiment, the area of opening 32 is in the order of 180 times larger than that of a nipple 26 having an I.D. of about 6 mm.

Figure 4:
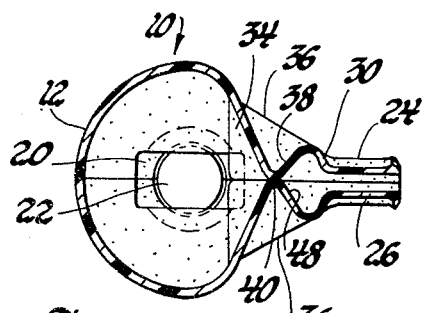
FIG. 4 is a sectional view taken along the plane indicated by lines 4—4 of FIG. 1.
Figure 5:
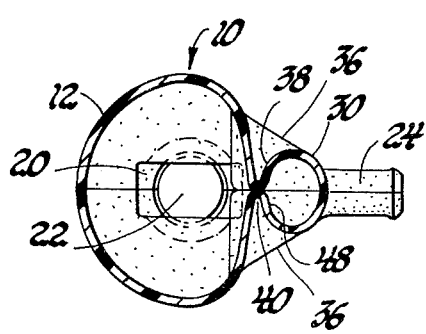
FIG. 5 is a sectional view taken along the plane indicated by lines 5—5 of FIG. 1.
Figure 6:
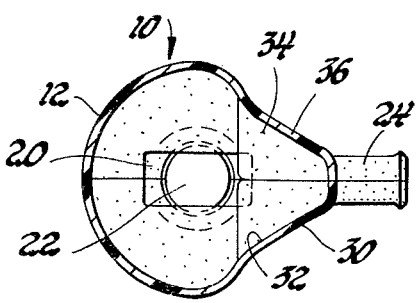
FIG. 6 is a sectional view taken generally along the planes indicated by lines 6—6 in FIG. 1.
Figure 7:
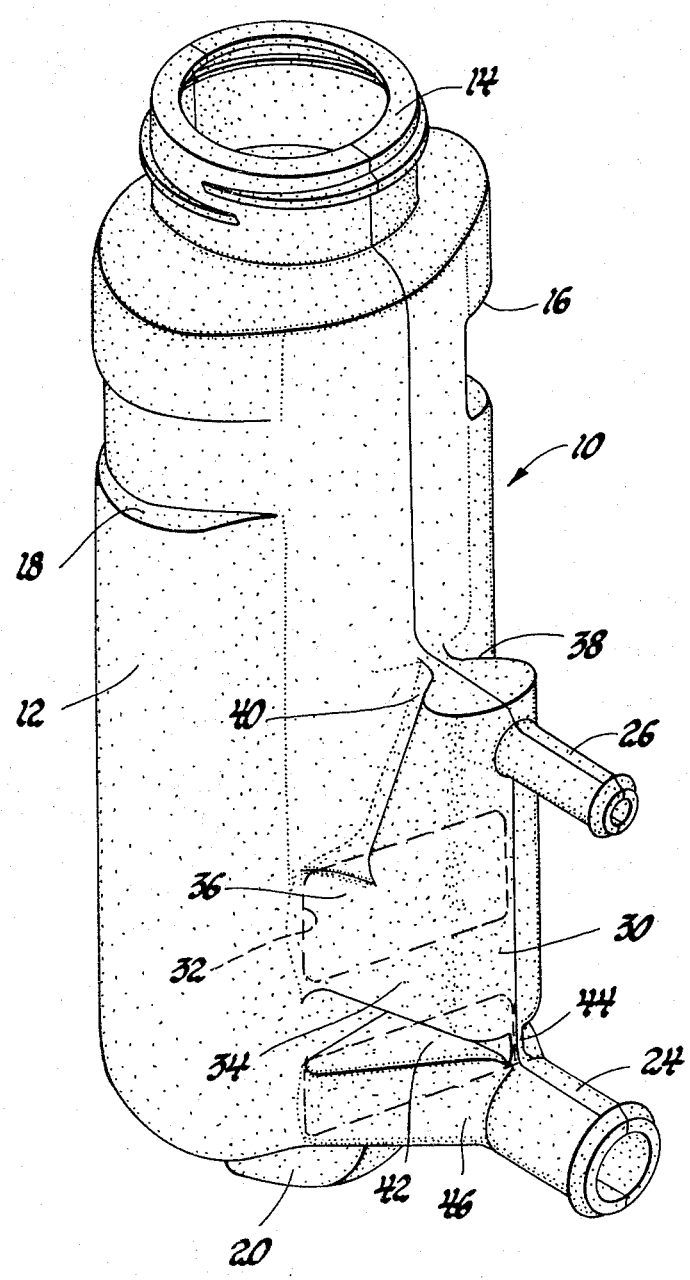
FIG. 7 is an enlarged perspective view.

In the particular illustrated embodiment, the cross-sections continuously widen toward the lower end 34, FIGS. 4 through 6 showing the transition that occurs. Above such lower end the antechamber, by known blow-mold techniques, has its walls separated from the walls of the main chamber by a mold-closure gap 38, this term being employed to identify regions where the two halves of the mold pieces assume very close proximity or actual engagement and define the margin of major mold cavities for the two chamber portions. Such mold halves are most conveniently of mirror image construction. During molding, some separation between the mold halves may be used to result in filling of the gap by a molded stiffening web 40 generally the full length of the gap.

A similar mold-closure gap 42 exists just below the lower end 34 of the antechamber with a web 44 molded into such gap. During molding, the mold-closure represented by gap 42 defines the bottom wall of lower end 34 and the upper wall of a tapered outlet section 46 of the main storage chamber 12 leading to outlet nipple 24. As seen best in FIGS. 1 and 2 the outlet section 46 has generally the same shape in lateral cross-sections, i.e., triangular, as does the lower end 34 of the antechamber portion 30.

As set forth, the conformation of antechamber portion 30 as defined by the mold closure gaps 38 and 42 is thus generally of L-shape to define a like fluid flow path. Additionally, with the lateral orientation of nipple 26, the flow first impinges upon the opposed wall 48 of the antechamber portion 30 and is directed downwardly to traverse the gradually widening cross-sectional area of successive lateral cross-sections of the antechamber legs until the fluid approaches opening 32. There, the bottom wall of the lower end or leg 34 redirects the fluid laterally through the opening 32 to the lowest levels of the main chamber. The incoming fluid has at that point a low velocity and relatively little tendency toward disturbance of the quantity of fluid contained within the storage chamber 12.

While blow-molding is preferred, the reservoir may alternatively be fabricated otherwise, as by injection molding of halves and subsequent bonding thereof. Also, while the particular L-shaped antechamber with ever-widening sections has proven effective, it will be recognized that departure to similar shapes have and will yield beneficial results within the spirit of the invention.

The embodiments of the invention in which an exclusive property or privilege is claimed are defined as follows:

1. A fluid reservoir molded of polymeric material and adapted for enhanced anti-turbulent storage of fluid entering at a high velocity from a fluid system, comprising, a main storage chamber portion, an antechamber portion separated from the main chamber portion, a fluid inlet opening formed adjacent the upper end of the antechamber portion for receiving high-velocity fluid from the fluid system, means adjacent the lower end of the antechamber portion defining an opening communicating the interiors of the antechamber and main chamber portions, the area of said communicating opening being a predetermined large multiple of the area of said inlet opening for passage of fluid from the antechamber portion to the main chamber portion at a velocity substantially reduced from that entering at said inlet opening, and the cross-sectional area across the direction of fluid flow of said antechamber between the ends thereof varying without discontinuity from a smallest area adjacent said inlet opening to a largest area adjacent said communicating opening for anti-turbulent transition of the velocity of fluid flow between said high and reduced values thereof.

2. A blow-molded fluid reservoir of polymeric material and adapted for enhanced anti-turbulent storage of fluid entering at a high velocity from a fluid system, comprising, a main storage chamber portion, an antechamber portion including walls separated from the walls of the main chamber portion, a fluid inlet opening formed adjacent the upper end of the antechamber portion for receiving high-velocity fluid from the fluid system, walls adjacent the lower end of the antechamber portion integrally associating said lower end with the main chamber portion and defining an opening communicating at said lower end the interiors of the antechamber and main chamber portions, said antechamber defining a sinuous course between said openings and the area of said communicating opening being a predetermined large multiple of the area of said inlet opening for passage of fluid from the antechamber portion to the main chamber portion at a velocity substantially reduced from that entering at said inlet opening, and the cross-sectional area of said antechamber across the direction of fluid flow between the ends thereof varying without discontinuity from a smallest area adjacent said inlet opening to a largest area adjacent the communicating opening for anti-turbulent transition of the velocity of fluid flow between said high and reduced values thereof.

3. A blow-molded fluid reservoir of polymeric material and adapted for enhanced anti-turbulent storage of fluid entering at a high velocity from a fluid system, comprising, a main storage chamber portion, an antechamber portion of generally L-shape in vertical section and including walls separated by a mold-closure gap from the walls of the main chamber portion, a fluid inlet tube formed adjacent the upper end of one leg of the antechamber portion and extending laterally of said leg for receiving high-velocity fluid from the fluid system and impinging the same on the opposed walls of the antechamber portion, walls within the other leg of the antechamber portion integrally associating said other leg with the main chamber portion and defining an opening communicating at said other leg the interiors of the antechamber and main chamber portions, the area of said communicating opening being a predetermined large multiple of the area of said inlet opening for passage of fluid from the antechamber portion to the main chamber portion at a velocity substantially reduced from that entering at said inlet opening, and the lateral cross-sectional area of said antechamber across the direction of fluid flow between the ends thereof smoothly varying from a smallest area adjacent said inlet opening to a largest area at the communicating opening for enhanced anti-turbulent transition of the velocity of fluid flow between said high and reduced values thereof.

* * * * *